(12) United States Patent
Kawachi et al.

(10) Patent No.: US 7,267,333 B2
(45) Date of Patent: Sep. 11, 2007

(54) POWER TRANSMISSION DEVICE AND SHEET FEEDING APPARATUS EQUIPPED THEREWITH

(75) Inventors: Kunihiro Kawachi, Tokyo (JP); Kazunobu Miura, Hachioji (JP); Ken Nonaka, Hachioji (JP); Kyoichi Mizuno, Tama (JP)

(73) Assignee: Konica Minolta Business Technologies, Inc. (JP)

( * ) Notice: Subject to any disclaimer, the term of this patent is extended or adjusted under 35 U.S.C. 154(b) by 329 days.

(21) Appl. No.: 10/828,717

(22) Filed: Apr. 21, 2004

(65) Prior Publication Data
US 2005/0035530 A1  Feb. 17, 2005

(30) Foreign Application Priority Data
Jul. 8, 2003  (JP)  ............... 2003-193502

(51) Int. Cl.
*B65H 3/06*  (2006.01)

(52) U.S. Cl. ............... 271/114; 271/117; 271/116; 271/109

(58) Field of Classification Search ................ 271/109, 271/114, 116, 117; 74/440, 409
See application file for complete search history.

(56) References Cited

U.S. PATENT DOCUMENTS

| | | | | |
|---|---|---|---|---|
| 5,901,950 A | * | 5/1999 | Kobayashi et al. | ......... 271/3.24 |
| 6,070,867 A | * | 6/2000 | Tsurumi et al. | ............. 271/114 |
| 6,661,986 B2 | * | 12/2003 | Kitayama | ................... 399/167 |
| 6,997,453 B2 | * | 2/2006 | Matsuda et al. | ............ 271/122 |

FOREIGN PATENT DOCUMENTS

JP   2002-265076   9/2002

\* cited by examiner

*Primary Examiner*—Patrick Mackey
*Assistant Examiner*—Kaitlin S Joerger
(74) *Attorney, Agent, or Firm*—Cantor Colburn LLP

(57) ABSTRACT

A power transmission device includes a driving gear having gears over an entire circumferential surface thereof, a follower gear including an intermittent gear having a toothless portion, and a controller for controlling the follower gear to be engaged with or disengaged from the driving gear. Each of the driving gear and the follower gear is a helical gear.

4 Claims, 4 Drawing Sheets

POWER TRANSMISSION DEVICE AND SHEET FEEDING APPARATUS EQUIPPED THEREWITH

BACKGROUND OF THE INVENTION

The invention relates to a power transmission device for transmitting rotation by gears and a sheet feeding apparatus having a power transmission device.

A power transmission device that transmits a continuous rotary movement through dividing it into rotary movements of a definite angle using an intermittent gear is used in a sheet feeding apparatus for conveying a sheet of paper.

For example, in the publication of the unexamined patent application 2002-265076, it is disclosed a sheet feeding apparatus which conveys out sheets of paper one by one by a process such that, by the combination of a driving gear with a follower gear made up of an intermittent gear, a continuous rotary movement of the driving gear is converted into followed rotations of a definite angle, which are transmitted to the follower gear, and the rotary movements of a definite angle of the follower gear are transmitted to sheet feed rollers.

In such a power transmission device, there is a problem that, because of shocks generated every time when the meshing of the gears transfers from a toothless state to a mesh state, shock sounds and wear or breakage of the gear teeth are generated.

For a countermeasure of this, it has heretofore been put into practice to provide a shock absorbing elastic member at the meshing portion.

Further, in the publication of the unexamined patent application 2002-265076, the generation of abnormal sounds and the breakage of the gear are prevented by making the shape of teeth of the follower gear such one as to be capable of reducing the pressing force at the time of meshing of the gears.

As regards the means in which an elastic member is provided, there are a problem that the number of parts increases which results in a high cost and a low durability of the device, a problem that the low durability of the elastic member causes the durability of the device to be lowered, a problem that it is difficult to fit a small gear with an elastic member, etc.

In the publication of the unexamined patent application 2002-265076, by the use of a means in which a notched slope is formed at the first tooth and the second tooth adjacent to a toothless portion at its downstream side in an intermittent gear, the abnormal sounds and the breakage of teeth are prevented. Because such a prevention means is to lower the strength of the teeth, it is insufficient for the prevention of the breakage of teeth, and the problem that a breakage of teeth occurs, for example, in a case where the torque of the drive force to be transmitted is large cannot be solved. Further, the means is insufficient for the prevention of the shock sound generated at the start of meshing.

That is, at the time of transition into meshing from a toothless portion, also in a gear device described in the publication of the unexamined patent application 2002-265076, because the transition into a mesh state is made at the same time over the whole length of a tooth in the axial direction, the shock is large, and a shock sound is generated.

As described above, the gear device in the publication of the unexamined patent application 2002-265076 is insufficient for both the purposes of the prevention of a shock sound and the prevention of a breakage of teeth.

SUMMARY OF THE INVENTION

It is an object of this invention, to prevent, in a power transmission device using an intermittent gear, a breakage of a tooth concerned and generation of shock sounds, to solve the problems in a conventional power transmission device as described above.

The above-mentioned object can be accomplished by any one of the structures described below.

Structure 1: A power transmission device comprising a driving gear made up of a whole gear, a follower gear including an intermittent gear component having a toothless portion, and a control means for practicing the mesh and release of mesh for said set of follower gears, characterized by said driving gear and said follower gear each being made up of a helical gear.

Structure 2: A power transmission device as set forth in the structure 1, characterized by further comprising an actuating means for meshing the aforesaid driving gear with the aforesaid follower gear when the aforesaid control means releases the mesh.

Structure 3: A power transmission device as set forth in any one of the structures 1 to 3, characterized by comprising the follower gear made up of a first follower gear and a second follower gear meshing with said first follower gear.

Structure 4: A power transmission device as set forth in the structure 1 or 2, characterized by the second follower gear including a whole gear component made up of a helical gear.

Structure 5: A sheet feeding apparatus comprising a sheet feed roller to be driven by a power transmission device as set forth in any one of the structures 1 to 4 and the aforesaid follower gear.

DETAILED DESCRIPTION OF THE PREFERRED EMBODIMENT

Figure 1:
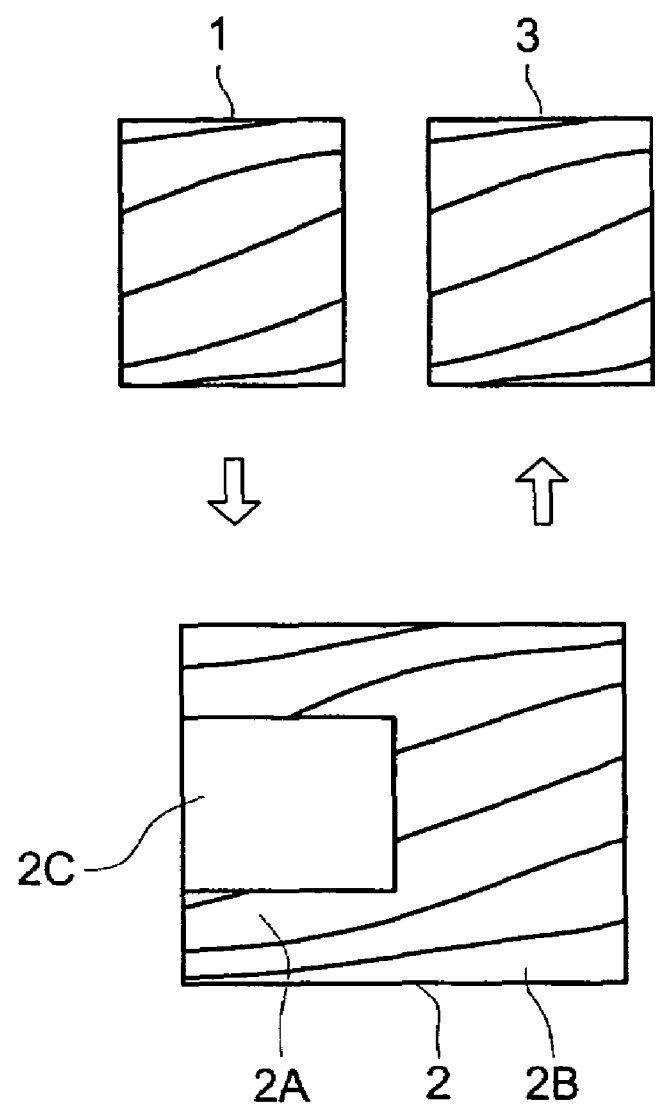
FIG. 1 is a conceptual drawing of a power transmission device of the embodiment of the invention.
Figure 2:
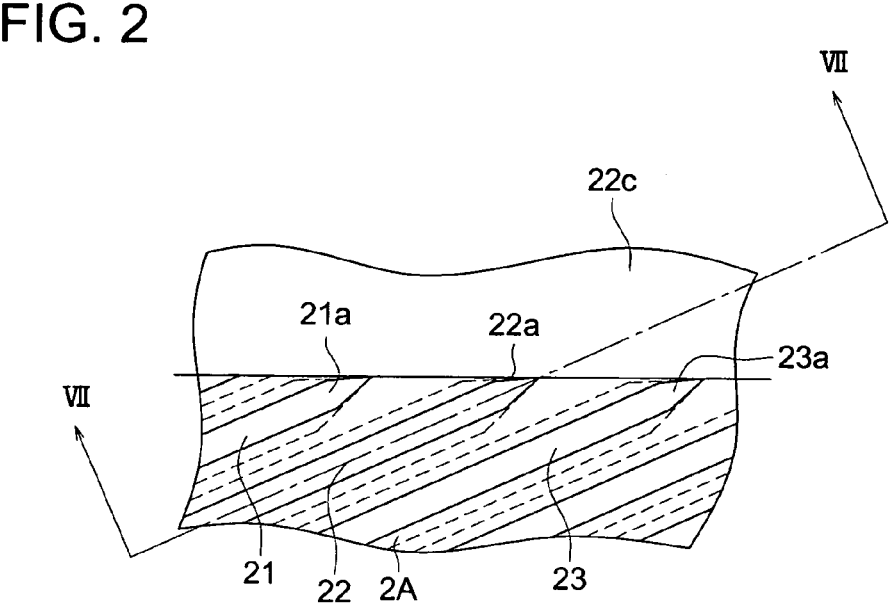
FIG. 2 is a partial view of an intermittent gear.

FIG. 1 is a conceptual drawing of a power transmission device of the embodiment of the invention, and FIG. 2 is a partial view of an intermittent gear.

In this description, a gear provided with teeth on the whole circumference is referred to as a whole gear for the purpose of discriminating it from an intermittent gear. In addition, the term "an intermittent gear" implies, as generally used, a gear having a toothless portion where no tooth is formed.

In FIG. 1, the numeral 1 denotes a driving gear made up of a whole gear, 2 denotes a first follower gear made up of an intermittent gear component 2A and a whole gear component 2B, and 3 denotes a second follower gear made up of a whole gear.

The drive gear 1 meshes with the intermittent gear component 2A of the first follower gear 2, and the whole gear component 2B of the first follower gear 2 meshes with the second follower gear 3.

As shown by the arrow marks, power is transmitted from the drive gear 1 to the first follower gear 2, and from the first follower gear 2 to the second follower gear 3.

The rotation of the driving gear 1 which is continuously rotating is transmitted to the intermittent gear component 2A, and the first follower gear 2 makes a rotation of a definite angle. After the rotation of said definite angle, at the step when the first follower gear has rotated to a position where the toothless portion 2C is at the mesh position with the driving gear, the transmission of power from the driving gear 1 to the first follower gear 2 is intercepted. Because the second follower gear 3 meshes with the whole gear component 2B of the first follower gear 2, the second follower gear 3 rotates following the rotation of the first follower gear 2, and stops in compliance with its stop.

Accordingly, to the second follower gear 3, the driving force of the driving gear 1 for the rotation of the definite angle is transmitted. The mechanism of power transmission using an intermittent gear explained above is well known.

In the invention, as shown in the drawings, the driving gear 1, the intermittent gear component 2A, the whole gear component 2B, and the second follower gear each is made up of a helical gear.

In a power transmission device having a structure as described above, as shown in FIG. 2, in the process of operation moving from a non-mesh state of the toothless portion 2C to a mesh state, the teeth 21, 22, and 23 start meshing at the leading portions 21a, 22a, and 23a facing the toothless portion 2C; that is, the whole tooth trace of one tooth is not simultaneously brought into mesh, as is done in a case where an intermittent gear made up of a spur gear is used. Accordingly, the shock at the time the operation moves from the state of no meshing of the toothless portion 2C to the state of meshing is eased extremely satisfactorily. In addition, in FIG. 2, the solid lines represent the crests of the teeth and the broken lines represent the bottoms of the teeth.

As the result, the generation of shock sounds and the breakage of teeth are sufficiently prevented. On top of it, force acting from the teeth of the drive gear 1 to the teeth of the first follower gear 2 is not directed perpendicularly to the tooth trace. That is, the force acting on the teeth of the intermittent gear component 2A of the first follower gear 2 is decomposed into a component perpendicular to the tooth trace and a component parallel to the tooth trace. Therefore, breaking force against teeth is effectively weakened, and even in a case where the driving torque is large, the breakage of teeth is prevented.

Figure 3:
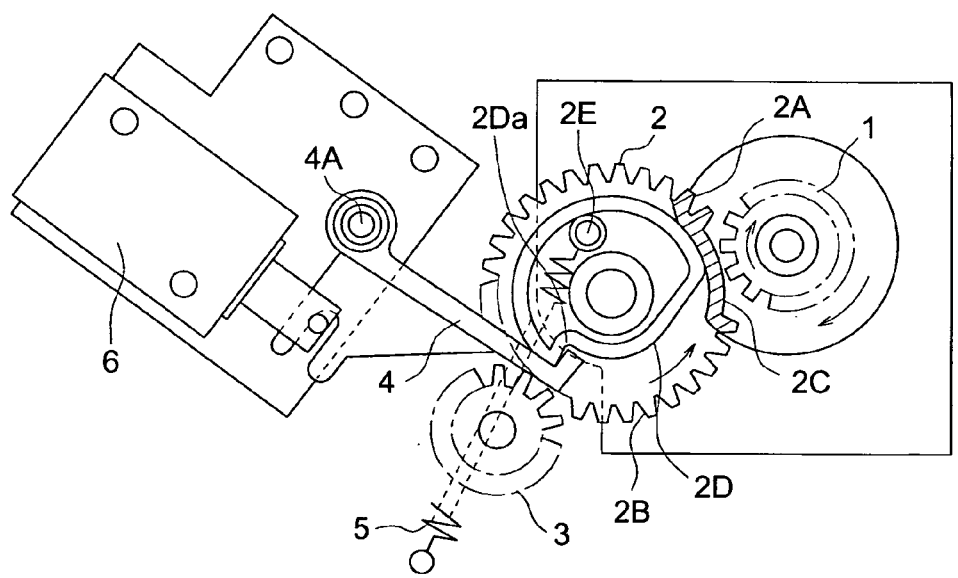
FIG. 3 is a drawing showing a concrete example of a power transmission device of the embodiment of the invention.

FIG. 3 shows a concrete example of a power transmission device of the embodiment of the invention.

As already explained, the driving gear 1 meshes with the intermittent gear component 2A of the first follower gear 2, and the second follower gear 3 meshes with the whole gear component 2B of the first follower gear 2.

In the first follower gear 2, there are provided an engagement part 2D having a step portion 2Da and a pin 2E. An engaging member 4 making up a control means engages with the engagement part 2D. Further, to the pin 2E, one end of a tension-type spring 5 as an actuating means whose another end is fixed at a fixed position is hooked. The engaging member 4 is supported rotatably around a shaft 4A, and is rotated clockwise, driven by a solenoid 6 that makes up the control means.

In the initial state shown in FIG. 2 where the driving gear 1 is continuously rotating in the arrow mark direction, but the power of the driving gear 1 is not transmitted to the first follower gear due to the toothless portion 2C facing the driving gear 1, when an actuation signal is inputted to the solenoid 6 making up the control means, the engaging member 4 is rotated clockwise around the shaft 4A, and the end portion becomes out of engagement with the step portion 2Da. As the result, the first follower gear 2 is rotated counter-clockwise by the driving force of the spring 5, which makes the driving gear 1 mesh with the intermittent gear component 2A, to rotate the first follower gear 2.

At the step when the first follower gear has rotated up to a position of an angle where the toothless portion 2C faces the driving gear 1, the power transmission of the driving gear 1 is intercepted, the end portion of the engaging member 4 engages with the step portion 2Da, and the first follower gear returns to the initial state shown in FIG. 3.

That is, the first follower gear 2 and the second follower gear 3 stop in the initial state by an actuation signal after the rotation of the definite angle. Accordingly, every time an actuation signal is inputted to the solenoid 6, the first follower gear 2 and the second follower gear 3 make the rotation of the definite angle.

Figure 4:
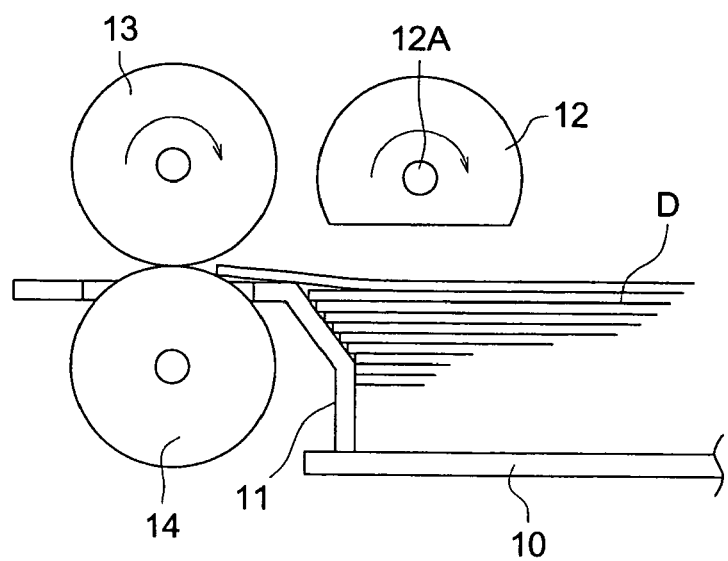
FIG. 4 is a drawing showing an example of a sheet feeding apparatus of the embodiment of the invention.

FIG. 4 shows an example of a sheet feeding apparatus of the embodiment of the invention having the power transmission device shown in FIG. 3.

In FIG. 4, the numeral 10 denotes a sheet feed tray, and sheets D are stacked in the sheet feed tray 10 with their leading edges regulated by a regulation member 11. The numeral 12 denotes a sheet feed roller, and as shown in the drawing, it is formed to have a half-moon cross-sectional shape with a part of a whole roller cut off. The numeral 13 denotes a conveyance roller, which rotates as shown by the arrow mark to convey a sheet D. The numeral 14 denotes a well-known separation roller having a torque limiter built in (not shown in the drawing). Thus, a separation and conveyance means for separating and conveying one sheet out of the stack of sheets D is made up of the conveyance roller 13 and the separation roller 14.

The shaft 12A of the sheet feed roller 12 is the rotary shaft driven by the second follower gear 3 in FIG. 2.

By the rotation of the shaft 12A, the sheet feed roller 12 makes one rotation as shown by the arrow mark, to feed out a sheet D from the uppermost position of the stack. The fed sheet D is conveyed by the conveyance roller 13, and if multiple-sheet feeding takes place, a single sheet on top is separated by the separation action of the separation roller 14. Thus, the single sheet is conveyed by the separation and conveyance means.

Figure 5:
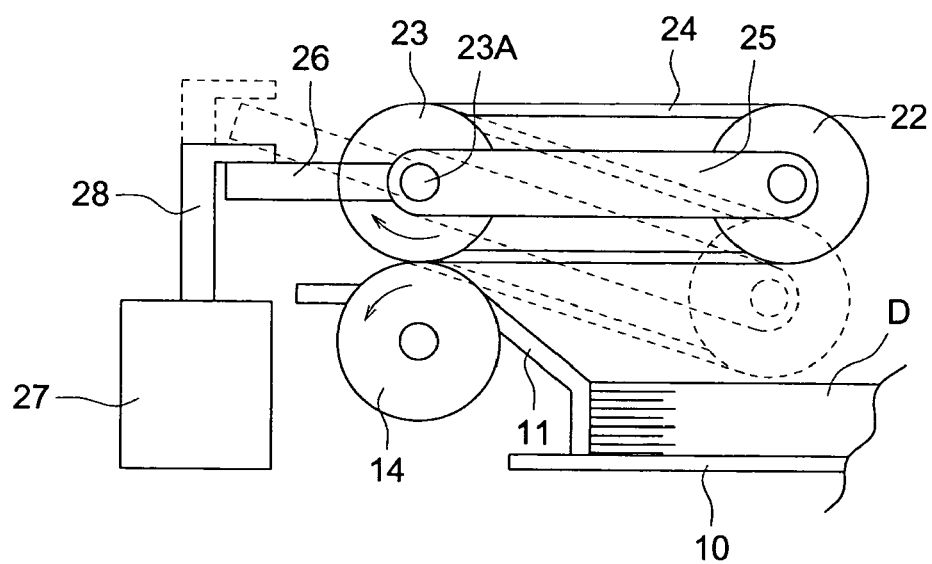
FIG. 5 is a drawing showing another example of a sheet feeding apparatus of the embodiment of the invention.

FIG. 5 shows another example of a sheet feeding apparatus of the embodiment of the invention.

In FIG. 5, a sheet feed roller 22 is coupled to a conveyance roller 23 by a coupling plate 25, while it receives a power transmitted from the conveyance roller 23 through a belt 24, and is driven by the conveyance roller 23. The conveyance roller 23 and a separation roller 24 having a torque limiter built in as the separation roller 14 shown in FIG. 4 make up a separation and conveyance means. In addition, the conveyance roller 23 is fitted with a one-way clutch (not shown in the drawing), and rotates freely in a case where a driving force is applied by a sheet D in the direction shown by the arrow mark.

At one end of the coupling plate 25, there is provided an arm 26, which engages with a plunger 28 of a solenoid 27.

Further, the shaft 23A of the conveyance roller 23 is the driving shaft, and is driven by the second follower gear 3 shown in FIG. 1 and FIG. 2.

The state shown by the solid line represents a standby state, and the sheet feed roller 22 is not in contact with sheets D.

When a sheet feed start signal is inputted to the solenoid 27, the plunger 28 of the solenoid 27 ascends, the sheet feed roller 25 descends up to the position indicated by the broken line owing to gravity, to become in contact with a sheet D, and presses the sheet D with a constant pressure.

Simultaneously with the descending of the sheet feed roller 22, the shaft 23A rotates, to rotate the conveyance roller 23 and the sheet feed roller 22, and a sheet D is fed out. At the point of time when the leading edge of the sheet D is conveyed out by a specified length, as explained before, the driving of the shaft 23A stops.

At this step of stop, the leading edge of the sheet D is conveyed by a pair of conveyance roller at the next stage (not shown in the drawing). Accordingly, even if the shaft 23A stops, the sheet D is conveyed by the pair of conveyance rollers at the next stage.

Figure 6:
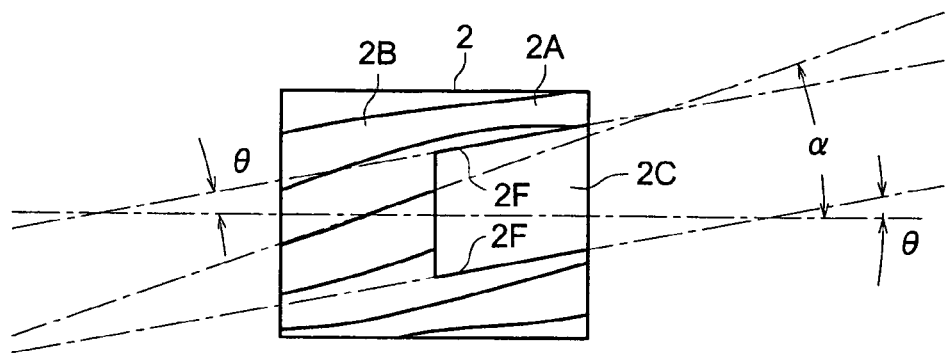
FIG. 6(a) and FIG. 6(b) are drawings each showing another example of a first follower gear.
Figure 6:
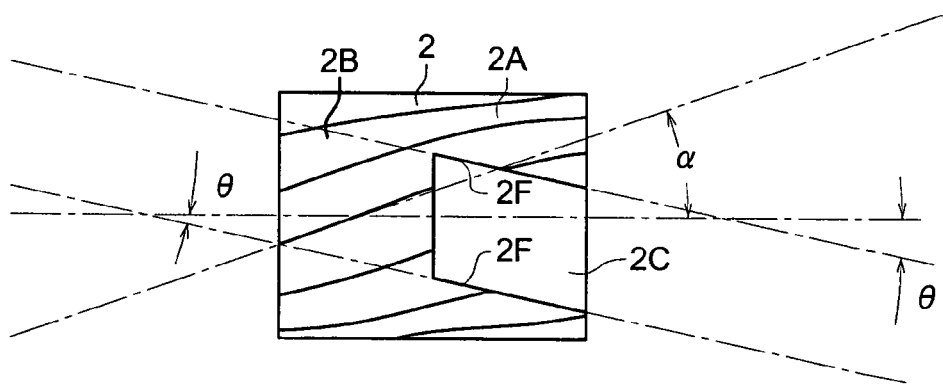

FIG. 6($a$) and FIG. 6($b$) each shows another example of the first follower gear.

In the example shown in FIG. 6($a$), a toothless portion 2C is formed with border lines inclined by an angle $\theta$ against the direction of the axis of rotation as shown by 2F. In the example shown in the drawing, the angle of inclination $\theta$ is determined to be a value of a little smaller than the angle of the tooth trace of the helical gear against the axis of rotation $\alpha$.

The example shown in FIG. 6($b$) is a case where the toothless portion is provided with the angle of inclination $\theta$ of its border lines 2F made to be of reverse sign in terms of positive or negative to the angle of the tooth trace against the axis of rotation $\alpha$.

By making the angle $\theta$ have a suitable value in FIG. 6($a$) and FIG. 6($b$), it is possible to make minimum the shock sounds and the wear and breakage of the teeth.

Figure 7:
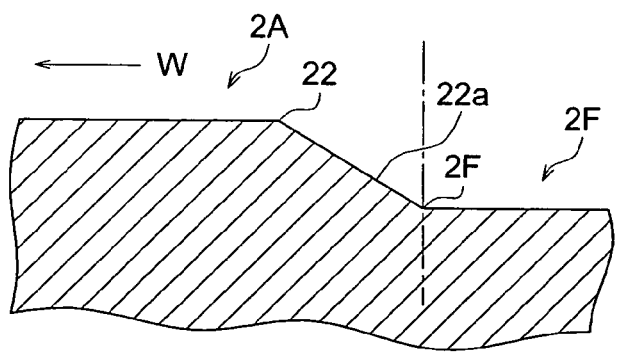
FIG. 7 is a cross-sectional view along the line VII-VII in FIG. 2.

FIG. 7 is a cross-sectional view along the line VII-VII in FIG. 2 and shows an example of the shape of tooth.

In FIG. 7, the tooth 22 is formed in a way such that its crest has a shape of a curve that gently rises in the neighborhood 22$a$ of the border line 2F between the toothless portion 2C and toothed portion of the intermittent gear portion 2A. Because the meshing with the driving gear proceeds in a manner as shown by the arrow mark W, the shock at the start of meshing is eased further as compared with the tooth 22 that is formed in such that its crest has a shape of a curve that sharply rises in the neighborhood 22$a$.

As the result, generation of shock sounds is prevented satisfactorily, and also wear and breakage of the teeth is prevented.

Further, for example, it becomes possible to make a power transmission device using a small gear with a module of 0.6 or under.

By an invention described in any one of the structures 1 to 5, it is possible to provide a power transmission device using an intermittent gear having a high durability, wherein generation of shock sounds and wear and breakage of its teeth are prevented without being accompanied by the increase of cost.

Further, a power transmission device using a small gear is actualized, and on top of it, it becomes possible to transmit a driving force of a large torque.

What is claimed is:

1. A power transmission device comprising:
   (a) a driving gear having gears over an entire circumferential surface thereof;
   (b) a first follower gear including an intermittent gear having a toothless portion;
   (c) a second follower gear having gears over an entire circumferential surface thereof; and
   (d) a controller for controlling the first follower gear to be engaged with or disengaged from the driving gear,
   wherein the first follower gear comprises the intermittent gear which is engaged with the driving gear and a whole gear over an entire circumferential surface thereof which is engaged with the second follower gear, and
   wherein each of the driving gear, the first follower gear comprising the intermittent gear and the whole gear of the first follower gear, and the second follower gear is a helical gear.

2. The power transmission device of claim 1, further comprising a starter for enabling the intermittent gear of the first follower gear to be engaged with the driving gear when the controller controls the follower gear to be disengaged from the driving gear.

3. A sheet feeding apparatus comprising:
   a sheet feeding roller driven by the power transmission device and the first and second follower gears described in claim 1.

4. The power transmission device of claim 1, wherein the intermittent gear having the toothless portion and the whole gear over the entire circumferential surface of the first follower gear are integrally formed.

* * * * *